Feb. 23, 1937.　　　　G. F. NOLTEIN　　　　2,072,011
INTERNAL COMBUSTION ENGINE
Filed Jan. 18, 1935　　　2 Sheets-Sheet 1

Inventor
George F. Noltein
By Owen & Owen
Attorneys

Feb. 23, 1937.       G. F. NOLTEIN       2,072,011
INTERNAL COMBUSTION ENGINE
Filed Jan. 18, 1935       2 Sheets-Sheet 2

Inventor
George F. Noltein
By Owen & Owen
Attorneys

Patented Feb. 23, 1937

2,072,011

UNITED STATES PATENT OFFICE 2,072,011

INTERNAL COMBUSTION ENGINE

George F. Noltein, Springfield, Ohio, assignor to The National Supply Company of Delaware, Toledo, Ohio, a corporation of Delaware Application January 18, 1935, Serial No. 2,382

8 Claims. (Cl. 123—65)

This invention relates to internal combustion engines and is more particularly directed to engines operating on a two stroke cycle.

The primary object of the invention is the provision of simple and efficient means to introduce an adequate quantity of air into a cylinder of an engine at a predetermined point in a cycle of operation and direct the flow of the air so as to produce complete scavenging of the burned gases, and if desired, simultaneously supercharging the engine.

Another object of the invention is the provision of a valve of the sleeve type to control the ports through which air is introduced into the cylinder.

Another object of the invention is to control the temperature at which the sleeve valve operates, and so control its expansion with relation to contiguous engine parts.

Another object of the invention is the provision of a sleeve valve and operating mechanism therefor which is free from high axial unbalanced outside forces, and which operates without direct contact with other major moving parts.

Other objects and advantages of the invention will become apparent as the description proceeds, reference being had to the accompanying drawings, in which—

Figure 1:
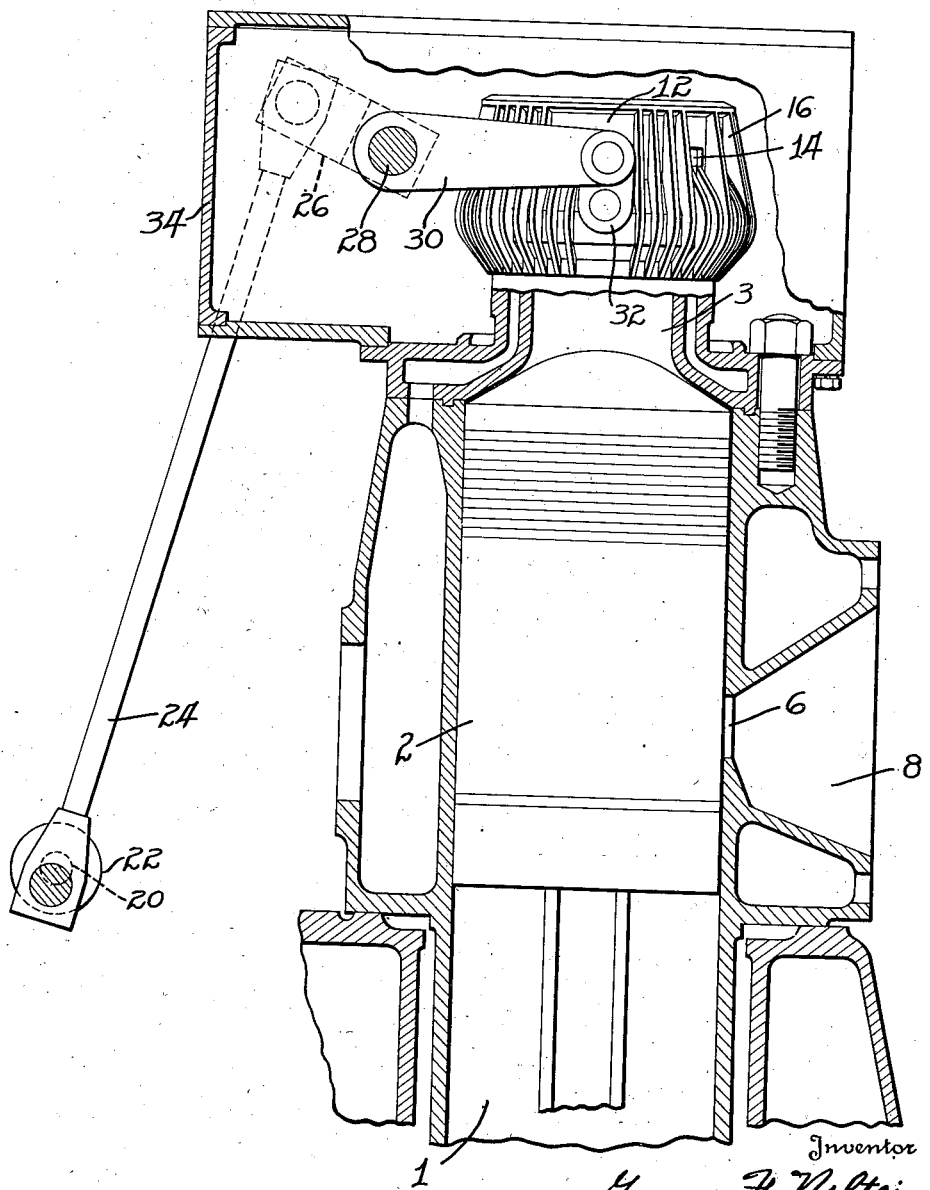
Figure 2:
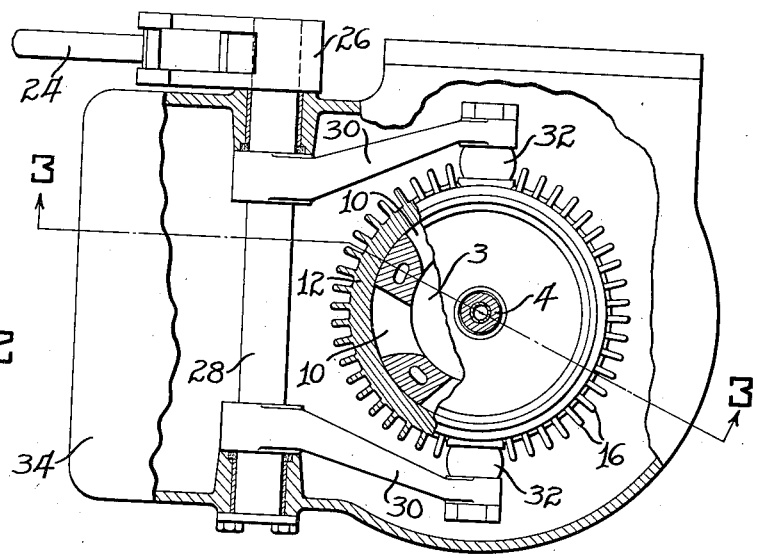
Figure 3:
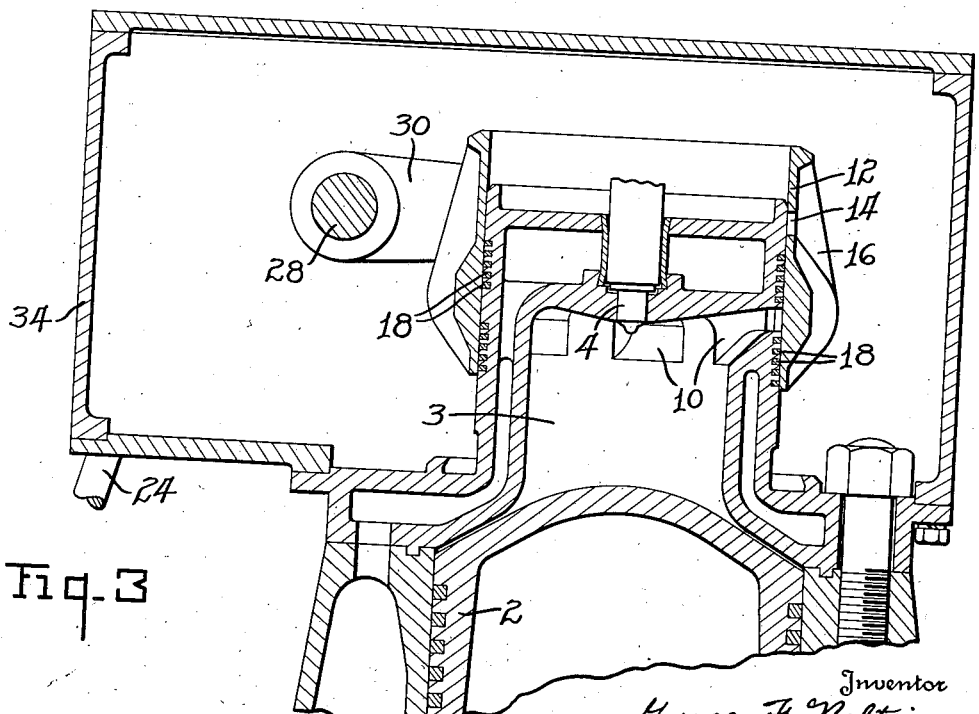

Figure 1 is a fragmentary sectional side view with a part broken away showing the invention applied to an engine; Fig. 2 is a fragmentary top view with parts broken away, of the device shown in Fig. 1; and Fig. 3 is an enlarged section on line 3—3 of Fig. 2.

Referring to the drawings, the present invention is disclosed in connection with an internal combustion engine having a cylinder 1 in which a piston 2 is reciprocated in the usual manner.

A combustion chamber 3 is formed in the cylinder head and may be of any suitable size or conformation. The cylinder head surrounding the chamber is of cylindrical form and is of sufficient length to permit mounting of a reciprocating valve in a manner hereinafter described. The head is water-jacketed in its interior to control the working temperature and is exteriorly exposed to the air whenever the reciprocating valve is in its upper position to further its cooling.

The engine shown is of the compression ignition type in which fuel is forced into the combustion chamber 3 through a fuel injection nozzle 4. The engine operates on a two stroke cycle so that each downward stroke of the piston is a working stroke accompanied by a burning of fuel in the cylinder. As the piston nears the lower limit of its travel, an exhaust port 6 is uncovered thereby, so that gases from the cylinder may pass out to an exhaust manifold 8. It is apparent that the size and disposition of this piston-controlled exhaust port may be varied with each individual engine design.

In order to promote a thorough cleansing of the cylinder at the end of each working stroke and to introduce fresh air to support subsequent combustion, it is necessary to admit an adequate volume of air to the cylinder. The air intake is customarily opened after the exhaust port is uncovered, but before it has been closed on the compression stroke. In this manner the first of the burned gas is forced out by its own pressure, while the remainder is forced out by the incoming air. The present invention utilizes this customary timing of the port openings, but changes the point of admission of the air from the lower end of the cylinder to the top, in or near the combustion chamber.

The air admission means includes a plurality of spaced ports 10 in the side wall of the combustion chamber. The walls defining the ports are formed at an angle to a radius of the combustion chamber as well as the axis thereof, so that the inrushing air is directed downwardly and along a rotary path to produce a swirling condition within the combustion chamber and cylinder. It will be seen that the available intake port area is very large so that a great volume of air may be introduced into the cylinder.

A sleeve valve is provided to simultaneously control the several air intake ports and includes a cylindrical body 12 surrounding the upper end of the cylinder head. An annular series of openings 14 is formed in the valve body and adapted to be moved into registry with the intake ports 10. In order to control the temperature at which the valve operates, the valve body is provided with a plurality of fins 16 to increase the metallic area exposed to the cooling effect of the surrounding air.

Sealing rings 18 are seated in grooves in the cylinder head above and below the ports 10 to confine the products of combustion within the cylinder and to prevent leakage of any gas to the outside.

Any suitable mechanism may be provided to reciprocate the sleeve valve in adjustably timed relation to the movements of the piston. This mechanism is diagrammatically illustrated as including a shaft 20 driven by the engine and having an adjustable crank or eccentric portion 22 to which a pitman 24 is connected. The opposite end of the pitman is connected to a lever 26 which is keyed or otherwise fixed to a rock-shaft 28. The rock-shaft extends adjacent the sleeve valve at one side thereof and its movement is transmitted to the valve by any suitable means, such as arms 30 which are keyed to the rock-shaft at one end and connected at the other end through links 32 to the valve body.

In the event it is desired to supply air under pressure to the engine, the cylinder head may be encased in a suitable housing 34 which forms a chamber for the compressed air. The rock-shaft 28 may be journaled in the housing and extend outwardly from one side thereof where the driving connection with the lever 26 is made. The bearing members for the rock-shaft 28 may be packed to prevent leakage of air from the casing 34.

It will be apparent that the timing of the air admission valve is such that the ports 10 are open only during a small portion of the stroke of the piston at the lower end. It will be seen that since the intake and exhaust ports are at substantially opposite ends of the cylinder, the flow of air tending to scavenge the cylinder reaches every portion. This scavenging action is further augmented by the rotary swirl of the inrushing air.

It will occur to those skilled in the art that the flow of the scavenging air may be readily reversed, and the ports 10 used as exhaust ports and air introduced through the port 6. In this manner the flow of air and direction of movement of the piston will be made similar. While the invention has been disclosed in conjunction with a particular design of driving mechanism and a particular design of engine, it should be expressly understood that such disclosure is solely for purposes of illustration, and that the invention properly includes all forms within the scope of the appended claims.

Having thus described my invention, what I claim as new, and desire to secure by United States Letters Patent, is:

1. An internal combustion engine having a cylinder, a hollow head on the cylinder forming a combustion chamber in communication with the firing end of the cylinder, said head having an air admission port to said combustion chamber, means enclosing said head for forming a chamber for air under pressure, a valve outside of said port and exposed to said air chamber, and means to reciprocate said valve to periodically uncover said port.

2. An internal combustion engine having a cylinder, a hollow head on the cylinder forming a combustion chamber in communication with the firing end of the cylinder, said head being externally of cylindrical form and having a plurality of side ports therearound for admission of air to said chamber, means enclosing said head and forming a chamber therearound for air under pressure, a valve sleeve mounted externally on said head, and means to reciprocate said valve to periodically uncover said ports to said air chamber.

3. An internal combustion engine having a cylinder, an extension on said cylinder at its firing end forming a combustion chamber in communication with the cylinder space, said extension having its wall internally water cooled and externally air cooled and having an air admission port to said chamber, a valve externally mounted on said extension in exposed air cooled position and means to reciprocate said valve to periodically uncover said port.

4. An internal combustion engine having a cylinder, a cylindrical extension on the firing end of said cylinder and forming a combustion chamber in communication with the cylinder space, said extension being externally cylindrical and having its wall internally water cooled and externally exposed to air for cooling and having a plurality of air admission ports therearound to said chamber, a sleeve valve externally mounted in telescoped relation and in exposed air cooled position on said extension and operable to periodically uncover said ports.

5. An internal combustion engine having a cylinder, a cylindrical extension on the firing end of said cylinder and forming a combustion chamber in communication with the interior of the cylinder, said extension being externally cylindrical and having its wall internally water cooled and externally exposed for air cooling and having a plurality of air admission ports therearound to said chamber, a sleeve valve externally mounted in exposed air cooled position on said extension and means to operate said valve to periodically uncover said ports, and means enclosing said extension and valve and forming a chamber therearound for air under pressure.

6. An internal combustion engine having an extension comprising a cylindrical combustion chamber, and having an air admission port in its side, a sleeve valve surrounding said extension and controlling said port, said valve having external cooling fins, and means providing a chamber for air under compression completely surrounding said valve.

7. An internal combustion engine comprising a combustion chamber having an inlet opening, an externally air cooled valve outside of and controlling said inlet, and means forming a chamber for compressed air completely surrounding said inlet and valve.

8. An internal combustion engine comprising a combustion chamber having an inlet opening, an externally air cooled valve outside of and controlling said inlet, means forming a chamber for compressed air completely surrounding said valve, and a shaft mounted in a packed bearing in the wall of the compressed air chamber for transmitting motion from an outside source to said valve.

GEORGE F. NOLTEIN.